(12) United States Patent
Wang et al.

(10) Patent No.: US 11,533,086 B2
(45) Date of Patent: *Dec. 20, 2022

(54) METHOD FOR DETERMINING PRECODING MATRIX INDICATOR, USER EQUIPMENT, AND BASE STATION EVOLVED NODEB

(71) Applicant: HUAWEI TECHNOLOGIES CO., LTD., Guangdong (CN)

(72) Inventors: Jianguo Wang, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 219 days.

This patent is subject to a terminal disclaimer.

(21) Appl. No.: 16/987,117

(22) Filed: Aug. 6, 2020

(65) Prior Publication Data

US 2020/0366346 A1    Nov. 19, 2020

Related U.S. Application Data

(63) Continuation of application No. 16/164,719, filed on Oct. 18, 2018, now Pat. No. 10,784,932, which is a
(Continued)

(51) Int. Cl.
*H04B 7/0456* (2017.01)
*H04B 7/06* (2006.01)
*H04L 25/03* (2006.01)

(52) U.S. Cl.
CPC ......... *H04B 7/0456* (2013.01); *H04B 7/0469* (2013.01); *H04B 7/0478* (2013.01);
(Continued)

(58) Field of Classification Search
None
See application file for complete search history.

(56) References Cited

U.S. PATENT DOCUMENTS 8,391,392 B2    3/2013   Melzer et al.
8,737,507 B2    5/2014   Asttely et al.
(Continued)

FOREIGN PATENT DOCUMENTS

CN    101635612 A    1/2010
CN    101686079 A    3/2010
(Continued)

OTHER PUBLICATIONS

3GPP TS 36.21 1 V1 1 .2.0 (Feb. 2013),3rd Generation Partnership Project;Technical Specification Group Radio Access Network;Evolved Universal Terrestrial Radio Access (E-UTRA);Physical Channels and Modulation(Release 11),total 109 pages.
(Continued)

*Primary Examiner* — Michael J Moore, Jr.
*Assistant Examiner* — Gautam Sharma
(74) *Attorney, Agent, or Firm* — Fish & Richardson P.C.

(57) ABSTRACT

The present disclosure relates to a method for determining a precoding matrix indicator, a user equipment (UE), a base station (e.g., eNB), and a system. The method includes: receiving a reference signal sent by a base station; selecting, based on the reference signal, a precoding matrix from a codebook, where a precoding matrix W included in the codebook is a product of two matrices $W_1$ and $W_2$, where $W_1$ is a block diagonal matrix, where each block matrix is a Kronecker product of a matrix $A_i$ and a matrix $B_i$; and sending a precoding matrix indicator (PMI) to the base station, where the PMI corresponds to the selected precoding matrix, so that the base station obtains the precoding matrix according to the PMI.

28 Claims, 2 Drawing Sheets

Related U.S. Application Data continuation of application No. 15/834,984, filed on Dec. 7, 2017, now Pat. No. 10,122,427, which is a continuation of application No. 14/923,019, filed on Oct. 26, 2015, now Pat. No. 9,859,962, which is a continuation of application No. 14/569,522, filed on Dec. 12, 2014, now Pat. No. 9,203,491, which is a continuation of application No. PCT/CN2012/076898, filed on Jun. 14, 2012.

(52) U.S. Cl.
CPC ............ *H04B 7/065* (2013.01); *H04B 7/0617* (2013.01); *H04B 7/0639* (2013.01); *H04L 25/03949* (2013.01); *H05K 999/99* (2013.01)

(56) References Cited

U.S. PATENT DOCUMENTS

| | | |
|---|---|---|
| 9,209,877 B2 | 12/2015 | Wang et al. |
| 9,214,996 B2 | 12/2015 | Kim et al. |
| 2009/0003466 A1 | 1/2009 | Taherzadehboroujenimah et al. |
| 2010/0045494 A1 | 2/2010 | Clerckx et al. |
| 2010/0322343 A1 | 12/2010 | Yeon et al. |
| 2011/0080969 A1 | 4/2011 | Joengren et al. |
| 2011/0085610 A1 | 4/2011 | Zhuang et al. |
| 2011/0110405 A1 | 5/2011 | Lee et al. |
| 2011/0170638 A1 | 7/2011 | Yuan et al. |
| 2011/0205930 A1 | 8/2011 | Rahman et al. |
| 2011/0216846 A1 | 9/2011 | Lee et al. |
| 2011/0235743 A1 | 9/2011 | Lee et al. |
| 2011/0249712 A1 | 10/2011 | Hammarwall et al. |
| 2011/0268207 A1 | 11/2011 | Choi et al. |
| 2011/0274188 A1 | 11/2011 | Sayana et al. |
| 2012/0039402 A1 | 2/2012 | Clerckx et al. |
| 2012/0082248 A1 | 4/2012 | Han et al. |
| 2012/0106595 A1 | 5/2012 | Bhattad et al. |
| 2012/0218948 A1 | 8/2012 | Onggosanusi et al. |
| 2012/0219042 A1 | 8/2012 | Onggosanusi et al. |
| 2012/0238039 A1 | 9/2012 | Cha et al. |
| 2012/0269290 A1 | 10/2012 | Onggosanusi et al. |
| 2012/0322492 A1 | 12/2012 | Koo et al. |
| 2012/0328039 A1 | 12/2012 | Mazzarese et al. |
| 2013/0010880 A1 | 1/2013 | Koivisto et al. |
| 2013/0028341 A1 | 1/2013 | Ayach et al. |
| 2013/0028344 A1 | 1/2013 | Chen et al. |
| 2013/0034179 A1 | 2/2013 | Zhang et al. |
| 2013/0058305 A1 | 3/2013 | Jang et al. |
| 2013/0058386 A1 | 3/2013 | Mazzarese |
| 2013/0058424 A1 | 3/2013 | Enescu et al. |
| 2013/0114654 A1 | 5/2013 | Gomadam |
| 2013/0129018 A1 | 5/2013 | Ko et al. |
| 2013/0156125 A1 | 6/2013 | Ko et al. |
| 2013/0163687 A1 | 6/2013 | Jing et al. |
| 2013/0230081 A1 | 9/2013 | Wernersson et al. |
| 2013/0259151 A1 | 10/2013 | Thomas et al. |
| 2013/0308715 A1 | 11/2013 | Nam et al. |
| 2013/0315328 A1 | 11/2013 | Liu |
| 2014/0098689 A1 | 4/2014 | Lee et al. |
| 2014/0133595 A1 | 5/2014 | Mazzarese et al. |
| 2014/0146778 A1 | 5/2014 | Wang et al. |
| 2014/0177744 A1 | 6/2014 | Krishnamurthy et al. |
| 2014/0177745 A1 | 6/2014 | Krishnamurthy et al. |
| 2014/0192762 A1 | 7/2014 | Li et al. |
| 2014/0226702 A1 | 8/2014 | Onggosanusi et al. |
| 2014/0301492 A1 | 10/2014 | Xin et al. |
| 2015/0012551 A1 | 1/2015 | Dong et al. |
| 2015/0049829 A1 | 2/2015 | Zhuang et al. |
| 2015/0244438 A1 | 8/2015 | Ding et al. |
| 2015/0256243 A1 | 9/2015 | Wang et al. |
| 2016/0043789 A1 | 2/2016 | Wang et al. |
| 2017/0366241 A1 | 12/2017 | Ko et al. |
| 2018/0097553 A1 | 4/2018 | Wang et al. |

FOREIGN PATENT DOCUMENTS

| | | |
|---|---|---|
| CN | 101771444 A | 7/2010 |
| CN | 101826943 A | 9/2010 |
| CN | 101931507 A | 12/2010 |
| CN | 101969366 A | 2/2011 |
| CN | 101969366 A | 2/2011 |
| CN | 102075274 A | 5/2011 |
| CN | 102082637 A | 6/2011 |
| CN | 102111197 A | 6/2011 |
| CN | 102122983 A | 7/2011 |
| CN | 102130752 A | 7/2011 |
| CN | 102255703 A | 11/2011 |
| CN | 102273091 A | 12/2011 |
| CN | 102299732 A | 12/2011 |
| CN | 102299775 A | 12/2011 |
| CN | 102714647 A | 10/2012 |
| CN | 102835054 A | 12/2012 |
| CN | 102870344 A | 1/2013 |
| CN | 102932112 A | 2/2013 |
| CN | 102938688 A | 2/2013 |
| CN | 102959878 A | 3/2013 |
| CN | 103039014 A | 4/2013 |
| CN | 103560818 A | 2/2014 |
| CN | 103782533 A | 5/2014 |
| EP | 2557700 A2 | 2/2013 |
| EP | 2590338 A2 | 5/2013 |
| EP | 2755417 A1 | 7/2014 |
| EP | 2820773 A1 | 1/2015 |
| JP | 2012531087 A | 12/2012 |
| JP | 2015528669 A | 9/2015 |
| JP | 2015536099 A | 12/2015 |
| JP | 2016532184 A | 10/2016 |
| WO | WO2009096708 A1 | 8/2009 |
| WO | WO2011082626 A1 | 7/2011 |
| WO | WO2011136627 A2 | 11/2011 |
| WO | WO2012002767 A2 | 1/2012 |
| WO | WO2012026742 A2 | 3/2012 |
| WO | WO2013024350 A2 | 2/2013 |
| WO | WO2013024351 A1 | 2/2013 |
| WO | WO2013034109 A1 | 3/2013 |
| WO | WO2013129985 A1 | 9/2013 |
| WO | WO2013185320 A1 | 12/2013 |
| WO | WO2014007591 A1 | 1/2014 |

OTHER PUBLICATIONS

3GPP TS 36.21 1 V1 1 .3.0 (Jun. 2013);3rd Generation Partnership Project;Technical Specification Group Radio Access Network;Evolved Universal Terrestrial Radio Access (E-UTRA);Physical Channels and Modulation(Release 1 1 ),total 108 pages.

3GPP TS 36.21 1 V10.3.0 (Sep. 2011);3rd Generation Partnership Project;Technical Specification Group Radio Access Network;Evolved Universal Terrestrial Radio Access (E-UTRA);Physical Channels and Modulation(Release 10),total 103 pages.

3GPP TS 36.211 V10.4.0 (Dec. 2011),3rd Generation Partnership Project;Technical Specification Group Radio Access Network;Evolved Universal Terrestrial Radio Access (E-UTRA);Physical Channels and Modulation(Release 10),total 101 pages.

3GPP TS 36.212 V1 1 .2.0 (Feb. 2013) ; 3rd Generation Partnership Project;Technical Specification Group Radio Access Network;Evolved Universal Terrestrial Radio Access (E-UTRA);Multiplexing and channel coding(Release 11) ; total 82 pages.

3GPP TS 36.212 V1 1 .3.0 (Jun. 2013) ; 3rd Generation Partnership Project;Technical Specification Group Radio Access Network;Evolved Universal Terrestrial Radio Access (E-UTRA);Multiplexing and channel coding(Release 11), total 84 pages.

3GPP TS 36.213 V1 1 .2.0 3rd Generation Partnership Project;Technical Specification Group Radio Access Network;Evolved Universal Terrestrial Radio Access (E-UTRA);Physical layer procedures(Release 11 ), Technical Specification, Feb. 2013, 173 pages.

3GPP TS 36.213 V1 1 .3.0 (Jun. 2013);3rd Generation Partnership Project;Technical Specification Group Radio Access Network;Evolved Universal Terrestrial Radio Access (E-UTRA);Physical layer procedures(Release 11),total 176 pages.

(56) References Cited

OTHER PUBLICATIONS

3GPP TS 36.213 V10.3.0 (Sep. 2011);3rd Generation Partnership Project;Technical Specification Group Radio Access Network;Evolved Universal Terrestrial Radio Access (E-UTRA);Physical layer procedures(Release 10),total 122 pages.
3GPP TS 36.213 V10.5.0 (Mar. 2012);3rd Generation Partnership Project;Technical Specification Group Radio Access Network;Evolved Universal Terrestrial Radio Access (E-UTRA);Physical layer procedures(Release 10),total 125 pages.
3GPP TS 36.331 V1 1 .3.0,3rd Generation Partnership Project;Technical Specification Group Radio Access Network;Evolved Universal Terrestrial Radio Access (E-UTRA);Radio Resource Control (RRC);Protocol specification(Release 11),Mar. 2013. total 344 pages.
3GPP TS 36.331 V10.8.0 (Dec. 2012);3rd Generation Partnership Project;Technical Specification Group Radio Access Network;Evolved Universal Terrestrial Radio Access (E-UTRA);Radio Resource Control (RRC);Protocol specification Release 10),total 305 pages.
3GPP TSG RAN WG1 Meeting #60bis, R1-102508, Rapporteur (NTT DOCOMO):Simulation Assumption for 8 Tx Codebook Design,Beijing, China, Apr. 12-16, 2010. 8 pages.
Acatel-Lucent et al., Way Forward on 8Tx Codebook for Rel.10 DL MIMO. 3GPP TSG RAN WG1 62 Madrid, Spain, Aug. 23-27, 2010, R1-105011, 6 pages.
Acatel-Lucent Shanghai Bell et al., Considerations on CSI feedback enhancements for high-priority antenna configurations, 3GPP TSG-RAN WG1#66 R1-1 12420, Aug. 26, 2011 ,total 8 pages.
Acatel-Lucent, Alcatel-Lucent Shanghai Bell, CQI/PMI reporting modes on PUCCH for two-stage feedback. 3GPP TSG RAN WG1 Meeting #62 Madrid, Spain, Aug. 23-27, 2010, R1-104397, 4 pages.
CATT, PMI/RI/CQI reporting for LTE-A. 3GPP TSG RAN WG1 Meeting #60bis Beijing, China, Apr. 12-16, 2010, R1-102056,total 4 pages.
CATT,"Performance evaluation of BTx preceding codebooks"3GPP TSG RAN WG1 Meeting #61 R1-102658,Montreal, Canada, May 10-14, 2010,total 7 pages.
CMCC et al.,"TP on multiple-column array antenna modeling",3GPP TSG-RAN4 Meeting #64bis R4-125978,Santa Rosa, US, Oct. 8-12, 2012,total 7 pages.
Ericsson et al., "Design and Evaluation of Precoder Codebooks for CSI Feedback," 3GPP TSG-RAN Wg1 #61bis R1-103839,Dresden, Germany, Jun. 28-Jul. 2, 2010,total 12 pages.
Ericsson, Further considerations on dual layer beamforming. 3GPP TSG-RAN WG1 #57 San Francisco, USA, May 4-8, 2009, R1-092187, 5 pages.
LG Electronics,"Feedback Codebook Enhancement and Performance Evaluation",3GPP TSG RAN WG1 Meeting #62 R1-104768,Madrid, Spain, Aug. 23-28, 2010,total 9 pages.
LG Electronics,"UCI transmission for Simultaneous PUCCH/PUSCH configuration",3GPP TSG RAN WG1 Meeting #63bis R1-110395,Dublin, Ireland, Jan. 17-21, 2011,total 4 pages.
Pantech, Extension of Rel-8 codebook for dual stage Rel-10 precoder, 3GPP TSG-RAN WG1#60bis R1-102409, Apr. 16, 2010,total 3 pages.
Phillip A Regaliat et al:Kronecker Products, Unitary Matrices and Signal Processing Applications,vol. 31, No. 4, Dec. 1989, XP055258118, Society for Industrial and Applied Mathematics, 28 pages.
R1-102724 LG Electronics,"Consideration on feedback design for LTE-A" ,3GPP TSG RAN WG1 Meeting #61, Montreal, Canada,May 1o-14, 2010,total 4 pages.
R1-112420 Alcatel-Lucent Shanghai Bell et al.,"Considerations on CSI feedback enhancements for high-priority antenna configurations",3GPP TSG-RAN WG1 #66,Aug. 22-26, 2011 ,total 7 pages.
R1-131761 Huawei et al,"WF on antenna model in 3D channel modeling",3GPP TSG RAN WG1 #72bis,Chicago, USA Apr. 15-19, 2013,total 7 pages.
RP-121413;"Study on Downlink Enhancements for Elevation Beamforming for L TE",3GPP Work Item Description. total 5 pages.
Samsung, Views on the feedback framework for Rel. 10. 3GPP TSG RAN WG1 Meeting #61 Montreal, Canada, May 10-May 14, 2010, R1-103377, 17 pages.
Samsung,"New SID Proposal: Study on Full Dimension MIMO for LTE",3GPP TSG RAN Meeting #57 RP-121410, Chicago, USA, Sep. 4-7, 2012,total 7 pages.

METHOD FOR DETERMINING PRECODING MATRIX INDICATOR, USER EQUIPMENT, AND BASE STATION EVOLVED NODEB

CROSS-REFERENCE TO RELATED APPLICATIONS

This application is a continuation of U.S. application Ser. No. 16/164,719, filed on Oct. 18, 2018, which is a continuation of U.S. application Ser. No. 15/834,984 filed on Dec. 7, 2017, now U.S. Pat. No. 10,122,427, which is a continuation of U.S. application Ser. No. 14/923,019 filed on Oct. 26, 2015, now U.S. Pat. No. 9,859,962, which is a continuation of U.S. application Ser. No. 14/569,522 filed on Dec. 12, 2014 now U.S. Pat. No. 9,203,491, which is a continuation of International Application No. PCT/CN2012/076898, filed on Jun. 14, 2012. All of the afore-mentioned patent applications are hereby incorporated by reference in their entireties.

TECHNICAL FIELD

The present invention relates to the field of mobile communications, and in particular, to a method for determining a precoding matrix indicator, a user equipment, a base station evolved NodeB, and a system.

BACKGROUND

A multiple-input multiple-output (MIMO) radio system can obtain diversity and array gains by means of transmit precoding and receive signal combination. A system that utilizes precoding may be expressed as:

$$y = H\hat{V}s + n$$

where y represents a vector of a received signal, H represents a channel matrix, $\hat{V}$ represents a precoding matrix, s represents a vector of a transmitted symbol, and H represents a measurement noise.

Optimal precoding generally requires that channel state information (CSI) is completely known by a transmitter. A commonly used method is that a user equipment (UE) or a mobile station (MS) (hereinafter generally referred to as UE) quantizes instantaneous CSI and feeds back the CSI to a NodeB, which includes a base station (BS), an access point, a transmission point (TP), or an evolved NodeB (eNB), where the evolved NodeB is generally referred to as an eNB. CSI information that is fed back by an existing Long Term Evolution (LTE) R8 system includes information such as a rank indicator (RI), a precoding matrix indicator (PMI), and a channel quality indicator (CQI), where the RI and the PMI respectively indicate the number of layers used and a precoding matrix. A set of used precoding matrices is generally referred to as a codebook, where each precoding matrix is a codeword in the codebook. To reduce system costs and meet higher requirements on the system capacity and coverage, an active antenna system (AAS) is already widely deployed in practice. Compared with an existing base station antenna, the AAS further provides a degree of freedom in design for the vertical direction.

An existing 4-antenna codebook, which is designed based on Householder transformation, of an LTE R8 system and an existing 8-antenna codebook, which is designed based on dual codebooks, of an LTE R10 system are mainly designed for a horizontal antenna, but a degree of freedom of a vertical antenna is not considered. When the 4-antenna codebook and the 8-antenna codebook are directly used in deployment of an AAS base station antenna, system performance severely deteriorates.

SUMMARY

Embodiments of the present invention provide a method for determining a precoding matrix indicator, a user equipment, a base station evolved NodeB eNB, and a system, which use a precoding matrix that supports vertical and horizontal quantization, and can fully use a degree of freedom of an active antenna system in a vertical direction, thereby improving CSI feedback accuracy and system throughput.

According to one aspect, an embodiment of the present invention provides a method for determining a precoding matrix indicator, where the method includes:

receiving a reference signal sent by a base station;

selecting, based on the reference signal, a precoding matrix from a codebook, where a precoding matrix W included in the codebook is a product of two matrices $W_1$ and $W_2$, where $W_1$ is a block diagonal matrix, that is, $W_1 = \text{diag} \{X_1, \ldots, X_{N_B}\}$, where each block matrix $X_i$ is a Kronecker product of a matrix $A_i$ and a matrix $B_i$, that is $X_i = A_i \otimes B_i$ and $1 \leq i \leq N_B$; and the $W_1$ includes at least one block matrix, that is, the number of block matrices is $N_B \geq 1$; and sending a precoding matrix indicator PMI to the base station, where the PMI corresponds to the selected precoding matrix, so that the base station obtains the precoding matrix according to the PMI.

According to another aspect, an embodiment of the present invention further provides a method for determining a precoding matrix indicator, where the method includes:

sending a reference signal to a user equipment UE; and receiving a precoding matrix indicator PMI sent by the UE, where the PMI corresponds to a precoding matrix that is selected by the U, based on the reference signal, from a codebook; and a precoding matrix W included in the codebook is a product of two matrices $W_1$ and $W_2$, where $W_1$ is a block diagonal matrix, that is, $W_1 = \text{diag} \{X_1, \ldots, X_{N_B}\}$, where each block matrix $X_i$ is a Kronecker product of a matrix $A_i$ and a matrix $B_i$, that is, $X_i = A_i \otimes B_i$, and $1 \leq i \leq N_B$; and the matrix $W_1$ includes at least one block matrix, that is, the number of block matrices is $N_B \geq 1$.

According to another aspect, correspondingly, an embodiment of the present invention provides a user equipment UE, including:

a receiving unit, configured to receive a reference signal sent by a base station;

a selecting unit, configured to select, based on the reference signal, a precoding matrix from a codebook, where a precoding matrix W included in the codebook is a product of two matrices $W_1$ and $W_2$, where $W_1$ is a block diagonal matrix, that is, $W_1 = \text{diag} \{X_1, \ldots, X_{N_B}\}$, where each block matrix $X_i$ is a Kronecker product of a matrix $A_i$ and a matrix $B_i$, that is, $X_i = A_i \otimes B_i$, and $1 \leq i \leq N_B$; and the $W_1$ includes at least one block matrix, that is, the number of block matrices is $N_B \geq 1$; and a sending unit, configured to send a precoding matrix indicator PMI to the base station, where the PMI corresponds to the selected precoding matrix, so that the base station obtains the precoding matrix according to the PMI.

According to another aspect, correspondingly, an embodiment of the present invention provides a base station eNB, including:

a sending unit, configured to send a reference signal to a user equipment UE; and a receiving unit, configured to receive a precoding matrix indicator PMI sent by the UE, where the PMI corresponds to a precoding matrix that is selected by the UE, based on the reference signal, from a codebook; and a precoding matrix W included in the codebook is a product of two matrices $W_1$ and $W_2$, where $W_1$ is a block diagonal matrix, that is, $W_1$=diag$\{X_1, \ldots, X_{N_B}\}$, where each block matrix $X_i$ is a Kronecker product of a matrix $A_i$ and a matrix $B_i$, that is, $X_i=A_i \otimes B_i$, and $1 \leq i \leq N_B$; and the matrix $W_1$ includes at least one block matrix, that is, the number of block matrices is $N_B \geq 1$.

According to another aspect, correspondingly, an embodiment of the present invention further provides a system for determining a precoding matrix indicator, including the foregoing terminal UE and base station eNB.

The method for determining a precoding matrix indicator, the user equipment UE, the base station eNB, and the system according to the embodiments of the present invention utilize a precoding matrix that supports vertical and horizontal quantization, which can not only use a degree of freedom in a horizontal direction, but also can use a degree of freedom in a vertical direction, thereby greatly improving CSI feedback accuracy and system throughput.

DETAILED DESCRIPTION

The following further describes the technical solutions of the present invention in detail with reference to the accompanying drawings and embodiments.

According to embodiments of the present invention, a codebook scheme is designed for an actual network deployment and antenna configuration, and especially for a base station antenna configuration condition of an active antenna system. According to the codebook scheme, a UE selects and reports a PMI, and a NodeB performs precoding according to PMI information reported by the UE, so as to improve performance of a system with the foregoing antenna configuration and especially with the AAS base station antenna configuration. The base station antenna can not only use a degree of freedom in a horizontal direction, but also can use a degree of freedom in a vertical direction.

Figure 1:
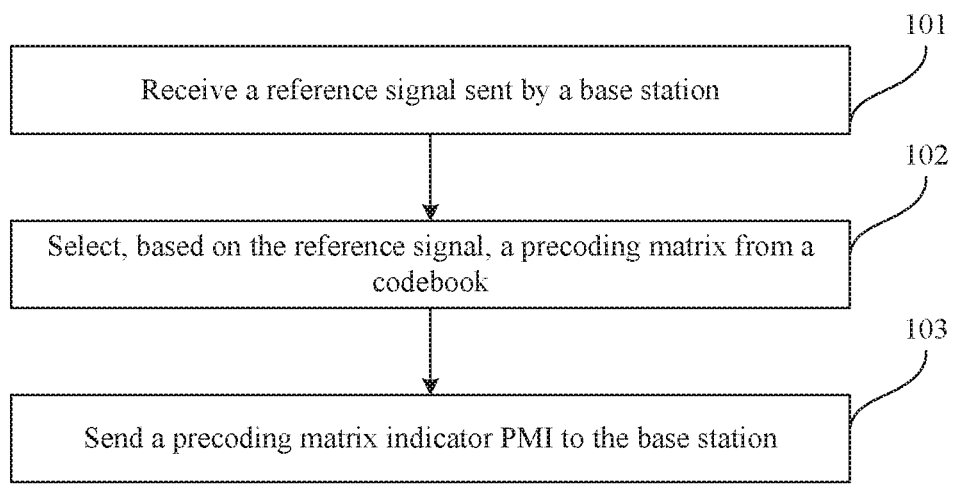
FIG. 1 is a flowchart of a first embodiment of a method for determining a precoding matrix indicator according to the present invention.

FIG. 1 is a flowchart of a first embodiment of a method for determining a precoding matrix indicator according to the present invention. As shown in the figure, this embodiment specifically includes the following steps:

Step 101: Receive a reference signal sent by a base station.

Specifically, the reference signal sent by the base station may include a channel state information reference signal (CSI RS), a demodulation reference signal (demodulation RS, DM RS), or a cell-specific reference signal (cell-specific RS, CRS). A user equipment UE may obtain a resource configuration of the reference signal by receiving a notification (for example, RRC (Radio Resource Control) signaling or downlink control information DCI) from an eNB or based on a cell identity ID, and obtain the reference signal from a corresponding resource or subframe.

Step 102: Select, based on the reference signal, a precoding matrix from a codebook, where a precoding matrix W included in the codebook is a product of two matrices $W_1$ and $W_2$, that is:

$$W = W_1 W_2 \quad (1)$$

where $W_1$ is a block diagonal matrix, that is:

$$W_1 = \text{diag}\{X_1, \ldots, X_{N_B}\} \quad (2)$$

where each block matrix $X_i$ is a Kronecker product of a matrix $A_i$ and a matrix $B_i$, that is:

$$X_i = A_i \otimes B_i, 1 \leq i \leq N_B \quad (3)$$

the $W_1$ includes at least one block matrix, that is, the number $N_B$ of block matrices is:

$$N_B \geq 1 \quad (4)$$

Specifically, each column of the matrix $A_i$ or of the matrix $B_i$ in formula (3) may be a discrete Fourier transform (DFT) vector or may be a column vector of a Hadamard matrix, that is:

$$A_i = [a_0 a_1 \ldots a_{N_a-1}] \quad (5)$$

$$B_i = [b_0 b_1 \ldots b_{N_b-1}] \quad (6)$$

therefore:

$$a_k \in \{f_0, f_1, \ldots, f_{N_f-1}\}, k=0, \ldots, N_a-1 \quad (7)$$

or $$a_k \in \{h_0, h_1, \ldots, h_{N_h-1}\}, k=0, \ldots, N_a-1 \quad (8)$$

or $$b_l \in \{f_0, f_1, \ldots, f_{N_f-1}\}, l=0, \ldots, N_b-1 \quad (9)$$

or $$b_l \in \{h_0, h_1, \ldots, h_{N_h-1}\}, l=0, \ldots, N_b-1 \quad (10)$$

where $N_a$ and $N_b$ represent the numbers of columns of the matrix $A_i$ and the matrix $B_i$, respectively; $h_m$, m=0, ..., $N_h$−1 represents a column vector of the Hadamard matrix, where $N_h$ represents the number of columns of the Hadamard matrix; and $f_n$, n=0, ..., $N_f$−1 represents a DFT vector, where $N_f$ is the number of DFT vectors, and the DFT vector $f_n$ may be represented as:

$$f_n = \left[ e^{j\frac{2\pi \cdot 0 \cdot n}{N}} \ e^{j\frac{2\pi \cdot 1 \cdot n}{N}} \ \ldots \ e^{j\frac{2\pi \cdot (M-1) \cdot n}{N}} \right]^T \quad (11)$$

where both M and N are integers.

Specifically, the matrix $A_i$ or the matrix $B_i$ in formula (3) may also be a precoding matrix in a 2-antenna codebook or a 4-antenna codebook of an LTE R8 system, or in an 8-antenna codebook of an LTE R10 system.

Further, the matrix $W_2$ is used to select or weight and combine a column vector in the matrix $W_1$, so as to form the matrix W.

In an example in which the number of block matrices is $N_B=2$ and there are 32 transmit antennas, matrices that form the precoding matrix W may separately be:

$$A_i = a_0, i = 1, 2 \quad (12)$$

where:

$$a_0 \in \{f_0, f_1, \ldots, f_3\} \quad (13)$$

$$[f_0, f_1, f_2, f_3] = \mathrm{diag}\{1, e^{jn\pi/8}, e^{jn\pi/4}, e^{jn\pi/8}\} F_4, n = 0, 1, 2, 3 \quad (14)$$

$$F_4 = \frac{1}{2} \times \begin{bmatrix} 1 & 1 & 1 & 1 \\ 1 & j & -1 & -j \\ 1 & -1 & 1 & -1 \\ 1 & -j & -1 & j \end{bmatrix} \quad (15)$$

or $$a_k \in \{h_0, h_1, \ldots, h_3\}, k = 0, \ldots, 3 \quad (16)$$

$$[h_0, h_1, \ldots, h_3] = \frac{1}{2} \times H_4 \quad (17)$$

where $H_4$ is a Hadamard matrix of order 4.

$$B_i \in \{[b_{(2k)\mathrm{mod}32}\ b_{(2k+1)\mathrm{mod}32}\ b_{(2k+2)\mathrm{mod}32}\ b_{(2k+3)\mathrm{mod}32}] : k = 0, 1, \cdots, 15\}, i = 1, 2 \quad (18)$$

$$b_{(2k+l)\mathrm{mod}32} = \left[ e^{j\frac{2\pi \cdot 0 \cdot ((2k+l)\mathrm{mod}32)}{32}}\ e^{j\frac{2\pi \cdot 1 \cdot ((2k+l)\mathrm{mod}32)}{32}}\ e^{j\frac{2\pi \cdot 2 \cdot ((2k+l)\mathrm{mod}32)}{32}}\ e^{j\frac{2\pi \cdot 3 \cdot ((2k+l)\mathrm{mod}32)}{32}} \right]^T, l = 0, 1, 2, 3 \quad (19)$$

where x mod y represents an operation of x mod y; and j represents a unit pure imaginary number, that is, $j = \sqrt{-1}$; or $B_i$ is a precoding matrix in a 4-antenna rank-4 codebook of an LTE R8 system.

$$W_2 \in \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\} \quad (20)$$

$$Y \in \{\tilde{e}_1, \tilde{e}_2, \tilde{e}_3, \tilde{e}_4\} \quad (21)$$

or $$W_2 \in \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\} \quad (22)$$

$$(Y_1, Y_2) \in \quad (23)$$

$$\{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}$$

where $\tilde{e}_n$, n=1, 2, 3, 4 represents a 4×1 selection vector in which all elements are 0 except the $n^{th}$ element being 1.

In an example in which the number of block matrices is $N_B = 2$ and there are 32 transmit antennas, matrices that form the precoding matrix W may also separately be:

$$A_i = [a_0 a_i], i = 1, 2 \quad (24)$$

$$a_0, a_1 \in \{f_0, f_1, \ldots f_3\} \quad (25)$$

where $f_i$, i=0, ..., 3 is shown in formula (14).

or $$a_0, a_1 \in \{h_0, h_1, \ldots, h_3\} \quad (26)$$

where $h_i$, i=0, ..., 3 is shown in formula (17);

the matrix $B_i$, i=1, 2 is shown in formulas (18) and (19), or the matrix $B_i$ is a precoding matrix in a 4-antenna rank-4 codebook of an LTE R8 system;

$$W_2 \in \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\} \quad (27)$$

$$Y \in \{e_1, e_2, e_3, e_4, e_5, e_6, e_7, e_8\} \text{ or } \quad (28)$$

$$W_2 \in \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\} \quad (29)$$

$$(Y_1, Y_2) \in \quad (30)$$

$$\{(e_1, e_1), (e_2, e_2), (e_3, e_3), (e_4, e_4), (e_1, e_2), (e_2, e_3), (e_1, e_4), (e_2, e_4)\}$$

where $e_n$, n=1, 2, . . . , 8 represents an 8×1 selection vector in which all elements are 0 except the $n^{th}$ element being 1.

Specifically, the selecting, based on the reference signal, a precoding matrix from a codebook includes:

obtaining, by the user equipment UE based on the reference signal, a channel estimate; and selecting, based on a predefined criterion such as a channel capacity or throughput maximization criterion, the precoding matrix from the codebook according to the channel estimate. Selecting, based on a predefined criterion, a precoding matrix is an existing technology, and details are not described herein.

Further, the selecting, based on the reference signal, a precoding matrix from a codebook includes:

selecting, based on the reference signal, the precoding matrix from a codebook subset, where the codebook subset may be a codebook subset that is predefined; or a codebook subset that is reported by the UE to the base station eNB, determined by the base station eNB based on the report from the UE, and notified to the UE; or a codebook subset that is determined and reported by the UE, for example, a latest reported codebook subset.

Further, the codebook subset may include:

a subset of the matrix $W_1$, the matrix $A_i$, the matrix $B_i$, or the matrix $W_2$.

The selecting, based on the codebook subset, the precoding matrix can further reduce feedback overheads and implementation complexity.

Further, the codebook subsets have a same subset of the matrix $W_1$ the matrix $A_i$, the matrix $B_i$, or the matrix $W_2$. In this way, the codebook subsets overlap each other, which can overcome an edge effect of channel state information quantization.

Further, in the precoding matrix, block matrices $X_i$ and $X_j$, $i \approx j$ may be unequal, or may also be equal. If there are multiple cases that $X_i$ and $X_j$, $i \approx j$ are equal, for example, $X_i$ and $X_j$, $i \approx j$ that are equal may appear in pairs, the feedback overheads can be further reduced.

In addition, the foregoing matrix $A_i$ or matrix $B_i$ may also use another form, which is not further elaborated herein.

It should be noted that, each of the foregoing matrices may further be multiplied by a scale factor, so as to implement power normalization or power equalization.

Step 103: Send a precoding matrix indicator PMI to the base station, where the PMI corresponds to the selected precoding matrix, so that the base station obtains the precoding matrix according to the PMI.

Specifically, the precoding matrix is included in a precoding matrix set or a codebook; and the PMI is used to indicate the selected precoding matrix in the precoding matrix set or the codebook.

Specifically, sending a precoding matrix indicator PMI to the base station includes: sending the precoding matrix indicator PMI to the base station, where the PMI may include only one specific value. In this case, the PMI directly indicates the precoding matrix W. For example, if there are a total of 16 different precoding matrices, PMI=0, . . . , 15 may be used to respectively indicate precoding matrices W whose labels are 0, 1, . . . , 15.

Specifically, sending a precoding matrix indicator PMI to the base station may also include: sending precoding matrix indicators $PMI_1$ and $PMI_2$ to the base station, where $PMI_1$ and $PMI_2$ are used to indicate the matrix $X_i = A_i \otimes B_i$, $1 \leq i \leq N_B$ in formula (2) and the matrix $W_2$, respectively; and in this case, the matrix $X_i = A_i \otimes B_i$, $1 \leq i \leq N_B$ and the matrix $W_2$ are respectively indicated by $PMI_1$ and $PMI_2$ in the codebook; or sending precoding matrix indicators $PMI_{11}$, $PMI_{12}$, and $PMI_2$ to the base station, where $PMI_{11}$, $PMI_{12}$, and $PMI_2$ are used to indicate the matrix $A_i$, $1 \leq i \leq N_B$, the matrix $B_i$, $1 \leq i \leq N_B$, and the matrix $W_2$, respectively; and in this case, the matrix $A_i$, $1 \leq i \leq N_B$, the matrix $B_i$, $1 \leq i \leq N_B$, and the matrix $W_2$ are respectively indicated by $PMI_{11}$, $PMI_{12}$, and $PMI_2$ in the codebook.

Further, the precoding matrix indicators $PMI_1$ and $PMI_2$, or the precoding matrix indicators $PMI_{11}$, $PMI_{12}$, and $PMI_2$ have different time domain granularities or frequency domain granularities, for example, $PMI_1$ and $PMI_2$, or $PMI_{11}$, $PMI_{12}$, and $PMI_2$ separately indicate different periods or bandwidth channel features, or are obtained based on different subframe periods or subband sizes.

Alternatively, further, the precoding matrix indicators $PMI_{11}$ and $PMI_{12}$ are sent to the base station according to different time periods.

Specifically, sending a precoding matrix indicator PMI to the base station may also include: sending precoding matrix indicators $PMI_{1,i}$, $1 \leq i \leq N_B$; and $PMI_2$ to the base station, where $PMI_{1,i}$, $1 \leq i \leq N_B$ and $PMI_2$ are used to indicate the matrix $X_i = A_i \otimes B_i$, $1 \leq i \leq N_B$ and the matrix $W_2$, respectively; or sending precoding matrix indicators $PMI_{11,i}$, $PMI_{12,i}$ and $PMI_2$ to the base station, where $PMI_{11,i}$, $PMI_{12,i}$, and $PMI_2$ are used to indicate the matrix $A_i$, $1 \leq i \leq N_B$, the matrix $B_i$, $1 \leq i \leq N_B$, and the matrix $W_2$, respectively.

Specifically, sending a precoding matrix indicator PMI to the base station may also include: sending precoding matrix indicators $PMI_{1,i}$, $1 \leq i \leq N_B/2$ and $PMI_2$ to the base station, where $PMI_{1,i}$, $1 \leq i \leq N_B/2$ and $PMI_2$ are used to indicate a matrix $X_{2i-1} = X_{2i} = A_{2i} \otimes B_{2i}$, $1 \leq i \leq N_B/2$ and the matrix $W_2$, respectively; and in this case, $X_{2i-1} = X_{2i}$, and the matrices appear in pairs; or sending precoding matrix indicators $PMI_{11,i}$, $PMI_{12,i}$, and $PMI_2$ to the base station, where $PMI_{11,i}$, $PMI_{12,i}$, and $PMI_2$ are used to indicate a matrix $A_{2i-1} = A_{2i}$, $1 \leq i \leq N_B/2$ the matrix $B_{2i-1} = B_{2i}$, $1 \leq i \leq N_B/2$, and the matrix $W_2$, respectively; and in this case, $A_{2i-1} = A_{2i}$, $B_{2i-1} = B_{2i}$, and the matrices appear in pairs.

Specifically, sending a precoding matrix indicator PMI to the base station may be sending, by the U, the precoding matrix indicator PMI to the base station through a physical uplink control channel (PUCCH) or a physical uplink shared channel (PUSCH).

Further, sending a precoding matrix indicator PMI to the base station may be separately sending, by the UE by using different subframes or according to different periods, the foregoing $PMI_1$ and $PMI_2$; or $PMI_{11}$, $PMI_{12}$, and $PMI_2$; or $PMI_{1,i}$, $1 \leq i \leq N_B$, and $PMI_2$; or $PMI_{11,i}$, $PMI_{12,i}$, $1 \leq i \leq N_B$, and $PMI_2$; or $PMI_{1,i}$, $1 \leq i \leq N_B/2$, and $PMI_2$; or $PMI_{11,i}$, $PMI_{12,i}$, $1 \leq i \leq N_B/2$ and $PMI_2$ to the base station.

Further, sending a precoding matrix indicator PMI to the base station may also be separately sending, by the UE for different subbands or subband sizes in a frequency domain, the foregoing $PMI_1$ and $PMI_2$; or $PMI_{11}$, $PMI_{12}$, and $PMI_2$; or $PMI_{1,i}$, $1 \leq i \leq N_B$, and $PMI_2$; or $PMI_{11,i}$, $PMI_{12,i}$, $1 \leq i \leq N_B$, and $PMI_2$; or $PMI_{1,i}$, $1 \leq i \leq N_B/2$, and $PMI_2$; or $PMI_{11,i}$, $PMI_{12,i}$, $1 \leq i \leq N_B/2$ and $PMI_2$ to the base station.

In this embodiment of the present invention, a user equipment determines and sends a precoding matrix indicator PMI, where the PMI indicates a precoding matrix. The precoding matrix has a structure of $W = W_1 W_2$, where $W_1$ is a block diagonal matrix in which each block matrix on a diagonal line is $X_i = A_i \otimes B_i$, and $i = 1, \ldots, N_B$, where the matrix $A_i$ or the matrix $B_i$ effectively supports channel state information quantization in a horizontal direction or a vertical direction, respectively. This can fully use a degree of freedom of an active antenna system AAS in a horizontal direction and a vertical direction, thereby greatly improving channel state information feedback accuracy. In addition, multiple block matrices $X_i$ may separately correspond to antenna groups of different polarizations or at different locations, so that the foregoing precoding matrix matches multiple antenna deployments or configurations. The foregoing codebook structure greatly improves performance of MIMO, and especially that of MU-MIMO. Moreover, one or more PMIs are fed back based on a subset to indicate a precoding matrix, which fully uses time/frequency domain/spatial correlation of a channel, thereby greatly reducing feedback overheads.

Figure 2:
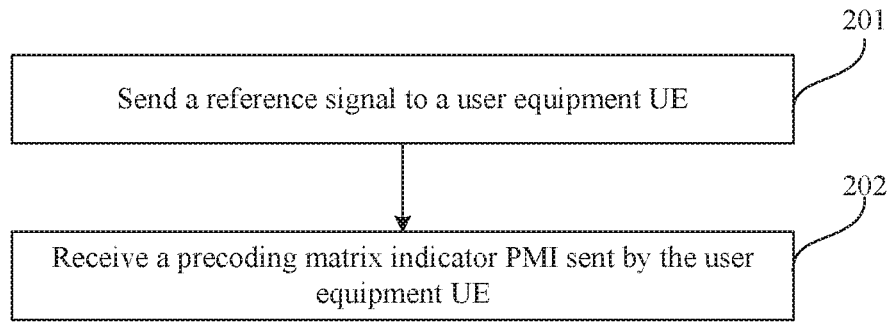
FIG. 2 is a flowchart of a second embodiment of a method for determining a precoding matrix indicator according to the present invention.

FIG. 2 is a flowchart of a second embodiment of a method for determining a precoding matrix indicator according to the present invention. As shown in the figure, this embodiment specifically includes:

Step 201: Send a reference signal to a user equipment U.

Specifically, the reference signal may include a channel state information reference signal (CSI RS), a demodulation reference signal (demodulation RS, DM RS), or a cell-specific reference signal (cell-specific RS, CRS). A base station eNB may notify the user equipment UE of a resource configuration of the reference signal by using RRC (Radio Resource Control) signaling or downlink control information DCI), and instruct the UE to obtain the reference signal from a corresponding resource or subframe. The user equipment UE may also implicitly obtain, based on other information such as a cell identity ID, the resource configuration of the reference signal, and obtain the reference signal from the corresponding resource or subframe.

Step 202: Receive a precoding matrix indicator PMI sent by the user equipment UE, where the PMI corresponds to a precoding matrix selected by the user equipment, based on the reference signal, from a codebook; and a precoding matrix W included in the codebook is a product of two matrices $W_1$ and $W_2$, and the precoding matrix has a structure shown in formulas (1) to (4).

Specifically, each column of the matrix $A_i$ or of the matrix $B_i$ may be a DFT vector or is a column vector of a Hadamard matrix, as shown in formulas (5) to (11); or specifically, the matrix $A_i$ or the matrix $B_i$ may also be a precoding matrix in a 2-antenna codebook or a 4-antenna codebook of an LTE R8 system, or in an 8-antenna codebook of an LTE R10 system.

Further, the matrix $W_2$ is used to select or weight and combine a column vector in the matrix $W_1$, so as to form the matrix W.

In an example in which the number of block matrices is $N_B=2$ and there are 32 transmit antennas, matrices that form the precoding matrix W may separately be those shown in formulas (12) to (23); or $B_i$ is a precoding matrix in a 4-antenna rank-4 codebook of an LTE R8 system.

In an example in which the number of block matrices is $N_B=2$ and there are 32 transmit antennas, matrices that form the precoding matrix W may separately be those shown in formulas (24) to (30); or $B_i$ is a precoding matrix in a 4-antenna rank-4 codebook of an LTE R8 system.

Specifically, selecting, based on the reference signal, a precoding matrix from a codebook includes:

selecting, based on the reference signal, the precoding matrix from a codebook subset, where the codebook subset may be a codebook subset that is predefined; or a codebook subset that is reported by the UE to the base station eNB, determined by the base station eNB based on the report from the UE, and notified to the UE; or a codebook subset that is determined and reported by the UE, for example, a latest reported codebook subset.

Further, the codebook subset may include a subset of the matrix $W_1$, the matrix $A_i$, the matrix $B_i$, or the matrix $W_2$.

Further, the codebook subsets have a same subset of the matrix $W_1$, the matrix $A_i$, the matrix $B_i$, or the matrix $W_2$. In this way, the codebook subsets overlap each other, which can overcome an edge effect of channel state information quantization.

Further, in the precoding matrix, block matrices $X_i$ and $X_j$, i≈j may be unequal, or may also be equal. If there are multiple cases that $X_i$ and $X_j$, i≈j are equal, for example, $X_i$ and $X_j$, i≈j that are equal may appear in pairs, feedback overheads can be further reduced.

In addition, the foregoing matrix $A_i$ or matrix $B_i$ may also use another form, which is not further elaborated herein.

It should be noted that, each of the foregoing matrices may further be multiplied by a scale factor, so as to implement power normalization or power equalization.

Specifically, the precoding matrix is included in a precoding matrix set or a codebook; and the PMI is used to indicate the selected precoding matrix in the precoding matrix set or the codebook.

Specifically, receiving a precoding matrix indicator PMI sent by the user equipment UE includes: receiving the precoding matrix indicator PMI sent by the user equipment UL, where the PMI may include only one specific value. In this case, the PMI directly indicates the precoding matrix W. For example, if there are a total of 16 different precoding matrices, PMI=0, . . . , 15 may be used to respectively indicate precoding matrices W whose labels are 0, 1 . . . 15.

Specifically, receiving a precoding matrix indicator PMI sent by the user equipment UE may also include: receiving precoding matrix indicators $PMI_1$ and $PMI_2$ sent by the user equipment UE, where $PMI_1$ and $PMI_2$ are used to indicate the matrix $X_i=A_i \otimes B_i$, $1 \leq i \leq N_B$, in formula (2) and the matrix $W_2$, respectively; and in this case, the matrix $X_i=A_i \otimes B_i$, $1 \leq i \leq N_B$, and the matrix $W_2$ are respectively indicated by $PMI_1$ and $PMI_2$ in the codebook; or receiving precoding matrix indicators $PMI_{11}$, $PMI_{12}$, and $PMI_2$ sent by the user equipment UE, where $PMI_{11}$, $PMI_{12}$, and $PMI_2$ are used to indicate the matrix $A_i$, $1 \leq i \leq N_B$, the matrix $B_i$, $1 \leq i \leq N_B$, and the matrix $W_2$, respectively; and in this case, the matrix $A_i$, $1 \leq i \leq N_B$, the matrix $B_i$, $1 \leq i \leq N_B$, and the matrix $W_2$ are respectively indicated by $PMI_{11}$, $PMI_{12}$, and $PMI_2$ in the codebook.

Further, the precoding matrix indicators $PMI_1$ and $PMI_2$, or the precoding matrix indicators $PMI_{11}$, $PMI_{12}$, and $PMI_2$ have different time domain granularities or frequency domain granularities, for example, $PMI_1$ and $PMI_2$, or $PMI_{11}$, $PMI_{12}$, and $PMI_2$ separately indicate different periods or bandwidth channel features, or are obtained based on different subframe periods or subband sizes.

Alternatively, further, the precoding matrix indicators $PMI_{11}$ and $PMI_{12}$ are sent to the base station according to different time periods.

Specifically, receiving a precoding matrix indicator PMI sent by the user equipment UE may also include: receiving precoding matrix indicators $PMI_{1,i}$, $1 \leq i \leq N_B$, and $PMI_2$ sent by the user equipment UE, where $PMI_{1,i}$, $1 \leq i \leq N_B$ and $PMI_2$ are used to indicate the matrix $X_i=A_i \otimes B_i$, $1 \leq i \leq N_B$, and the matrix $W_2$, respectively; or receiving precoding matrix indicators $PMI_{11,i}$, $PMI_{12,i}$, and $PMI_2$ sent by the user equipment UE, where $PMI_{11,i}$, $PMI_{12,i}$, and $PMI_2$ are used to indicate the matrix $A_i$, $1 \leq i \leq N_B$, the matrix $B_i$, $1 \leq i \leq N_B$, and the matrix $W_2$ respectively; or receiving precoding matrix indicators $PMI_{1,i}$, $1 \leq i \leq N_B/2$, and $PMI_2$ sent by the user equipment UE, where $PMI_{1,i}$, $1 \leq i \leq N_B/2$ and $PMI_2$ are used to indicate a matrix $X_{2i-1}=X_{2i}=A_{2i} \otimes B_{2i}$, $1 \leq i \leq N/2$, and the matrix $W_2$ respectively; and in this case, $X_{2i-1}=X_{2i}$, and the matrices appear in pairs; or receiving precoding matrix indicators $PMI_{11,i}$, $PMI_{12,i}$, and $PMI_2$ sent by the user equipment UE, where $PMI_{11,i}$, $PMI_{12,i}$, and $PMI_2$ are used to indicate a matrix $A_{2i-1}=A_{2i}$, $1 \leq i \leq N_B/2$, the matrix $B_{2i-1}=B_{2i}$, $1 \leq i \leq N_B/2$, and the matrix $W_2$, respectively; and in this case, $A_{2i-1}=A_{2i}$, $B_{2i-1}=B_{2i}$, and the matrices appear in pairs.

Specifically, receiving a precoding matrix indicator PMI sent by the user equipment UE may be receiving, through a physical uplink control channel (PUCCI) or a physical uplink shared channel (PUSCH), the precoding matrix indicator PMI sent by the user equipment UE.

Further, receiving a precoding matrix indicator PMI sent by the user equipment UE may be separately receiving, by the base station by using different subframes or according to different periods, the foregoing $PMI_1$ and $PMI_2$; or $PMI_{11}$, $PMI_{12}$, and $PMI_2$; or $PMI_{1,i}$, $1 \leq i \leq N_B$ and $PMI_2$ or $PMI_{11,i}$, $PMI_{12,i}$, $1 \leq i \leq N_B$, and $PMI_2$; or $PMI_{11,i}$, $PMI_{12,i}$, $1 \leq i \leq N_B/2$, and $PMI_2$ that are sent by the user equipment UE; or may also be receiving the foregoing $PMI_1$ and $PMI_2$; or $PMI_{11}$, $PMI_{12}$, and $PMI_2$; or $PMI_{1,i}$, $1 \leq i \leq N_B$ and $PMI_2$; or $PMI_{11,i}$, $PMI_{12,i}$, $1 \leq i \leq N_B$, and $PMI_2$; or $PMI_{11,i}$, $PMI_{12,i}$, $1 \leq i \leq N_B/2$, and $PMI_2$ that are sent for different subbands or subband sizes in a frequency domain by the user equipment U.

In this embodiment of the present invention, a base station eNB receives a precoding matrix indicator PMI sent by a user equipment UE, where the PMI indicates a precoding matrix. The precoding matrix has a structure of $W=W_1W_2$, where $W_1$ is a block diagonal matrix in which each block matrix on a diagonal line is $X_i=A_i \otimes B_i$, and i=1, . . . , $N_B$, where the matrix $A_i$ or the matrix $B_i$ effectively supports channel state information quantization in a horizontal direction or a vertical direction, respectively. This can fully use a degree of freedom of an active antenna system AAS in a horizontal direction and a vertical direction, thereby greatly improving channel state information feedback accuracy. In addition, multiple block matrices $X_i$ may separately correspond to antenna groups of different polarizations or at different locations, so that the foregoing precoding matrix matches multiple antenna deployments or configurations.

The foregoing codebook structure greatly improves performance of MIMO, and especially that of MU-MIMO. Moreover, one or more PMIs are fed back based on a subset to indicate a precoding matrix, which fully uses time/frequency domain/spatial correlation of a channel, thereby greatly reducing feedback overheads.

The following describes a system for determining a precoding matrix indicator, a user equipment UE, and a base station eNB in the present invention in detail.

Figure 3:
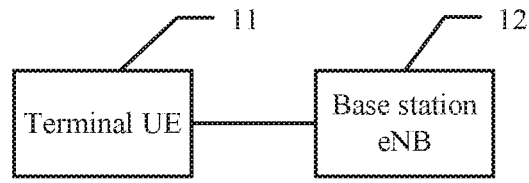
FIG. 3 is a schematic structural diagram of composition of a system for determining a precoding matrix indicator according to the present invention.

FIG. 3 is a schematic structural diagram of composition of an embodiment of a system for determining a precoding matrix indicator according to the present invention. The system according to this embodiment of the present invention includes a user equipment UE 11 and a base station eNB 12. For a structure of the user equipment UE 11, refer to FIG. 4; and for a schematic structural diagram of the base station eNB 12, refer to FIG. 5.

Figure 4:
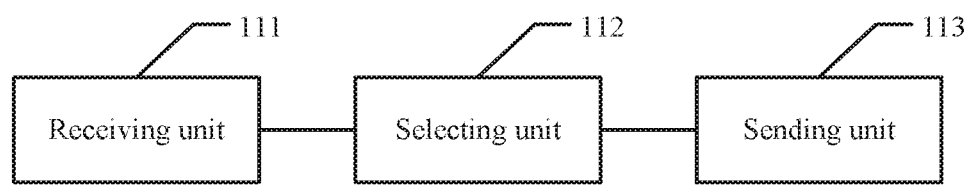
FIG. 4 is a schematic structural diagram of composition of a user equipment UE in FIG. 3.

FIG. 4 is a schematic diagram of a user equipment UE 11 for determining a precoding matrix indicator according to an embodiment of the present invention. As shown in the figure, the user equipment UE 11 includes: a receiving unit 111, a selecting unit 112, and a sending unit 113.

The receiving unit 111 is configured to receive a reference signal sent by a base station.

Specifically, the reference signal sent by the base station may include a channel state information reference signal (CSI RS), a demodulation reference signal (demodulation RS, DM RS), or a cell-specific reference signal (cell-specific RS, CRS). The user equipment UE may obtain a resource configuration of the reference signal by receiving a notification (for example, RRC (Radio Resource Control) signaling or downlink control information DCI) from an eNB or based on a cell identity ID, and obtain the reference signal from a corresponding resource or subframe.

The selecting unit 112 is configured to select, based on the reference signal, a precoding matrix from a codebook, where a precoding matrix W included in the codebook is a product of two matrices $W_1$ and $W_2$; and the precoding matrix has the structure shown in formulas (1) to (4).

Specifically, each column of the matrix $A_i$ or of the matrix $B_i$ may be a DFT vector or may be a column vector of a Hadamard matrix, as shown in formulas (5) to (11); or specifically, the matrix $A_i$ or the matrix $B_i$ may also be a precoding matrix in a 2-antenna codebook or a 4-antenna codebook of an LTE R8 system, or in an 8-antenna codebook of an LTE R10 system.

Further, the matrix $W_2$ is used to select or weight and combine a column vector in the matrix $W_1$, so as to form the matrix W.

In an example in which the number of block matrices is $N_B=2$ and there are 32 transmit antennas, matrices that form the precoding matrix W may separately be those shown in formulas (12) to (23); or $B_i$ is a precoding matrix in a 4-antenna rank-4 codebook of an LTE R8 system.

In an example in which the number of block matrices is A=2 and there are 32 transmit antennas, matrices that form the precoding matrix W may separately be those shown in formulas (24) to (30); or $B_i$ is a precoding matrix in a 4-antenna rank-4 codebook of an LTE R8 system.

Specifically, selecting, based on the reference signal, a precoding matrix from a codebook includes:

obtaining, by the user equipment UE based on the reference signal, a channel estimate and selecting, based on a predefined criterion such as a channel capacity or throughput maximization criterion, the precoding matrix from the codebook according to the channel estimate. Selecting, based on a predefined criterion, a precoding matrix is an existing technology, and details are not described herein.

Further, selecting, based on the reference signal, a precoding matrix from a codebook includes:

selecting, based on the reference signal, the precoding matrix from a codebook subset, where the codebook subset may be a codebook subset that is predefined; or a codebook subset that is reported by the UE to the base station eNB, determined by the base station eNB based on the report from the UE, and notified to the UE; or a codebook subset that is determined and reported by the UE, for example, a latest reported codebook subset.

Further, the codebook subset may include a subset of the matrix $W_1$, the matrix $A_i$, the matrix $B_i$, or the matrix $W_2$.

Selecting, based on the codebook subset, the precoding matrix can further reduce feedback overheads and implementation complexity.

Further, the codebook subsets have a same subset of the matrix $W_1$, the matrix $A_i$, the matrix $B_i$, or the matrix $W_2$. In this way, the codebook subsets overlap each other, which can overcome an edge effect of channel state information quantization.

Further, in the precoding matrix, block matrices $X_i$ and $X_j$, $i \approx j$ may be unequal, or may also be equal. If there are multiple cases that $X_i$ and $X_j$, $i \approx j$ are equal, for example, $X_i$ and $X_j$, $i \approx j$ that are equal may appear in pairs, the feedback overheads can be further reduced.

In addition, the foregoing matrix $A_i$ or matrix $B_i$ may also use another form, which is not further elaborated herein.

It should be noted that, each of the foregoing matrices may further be multiplied by a scale factor, so as to implement power normalization or power balancing.

The sending unit 113 is configured to send a precoding matrix indicator PMI to the base station, where the PMI corresponds to the selected precoding matrix, so that the base station obtains the precoding matrix according to the PMI.

Specifically, the precoding matrix is included in a precoding matrix set or a codebook; and the PMI is used to indicate the selected precoding matrix in the precoding matrix set or the codebook.

Specifically, sending a precoding matrix indicator PMI to the base station includes: sending the precoding matrix indicator PMI to the base station, where the PMI may include only one specific value. In this case, the PMI directly indicates the precoding matrix W. For example, if there are a total of 16 different precoding matrices, PMI=0, . . . , 15 may be used to respectively indicate precoding matrices W whose labels are 0, 1, . . . , 15.

Specifically, sending a precoding matrix indicator PMI to the base station may also include: sending precoding matrix indicators $PMI_1$ and $PMI_2$ to the base station, where $PMI_1$ and $PMI_2$ are used to indicate the matrix $X_i=A_i \otimes B_i$, $1 \le i \le N_B$ in formula (2) and the matrix $W_2$, respectively; and in this case, the matrix $X_i=A_i \otimes B_i$, $1 \le i \le N_B$, and the matrix $W_2$ are respectively indicated by $PMI_1$ and $PMI_2$ in the codebook; or sending precoding matrix indicators $PMI_{11}$, $PMI_{12}$, and $PMI_2$ to the base station, where $PMI_{11}$, $PMI_{12}$, and $PMI_2$ are used to indicate the matrix $A_i$, $1 \le i \ N_B$, the matrix $B_i$, $1 \le i \le N_B$, and the matrix $W_2$, respectively; and in this case, the matrix $A_i$, $1 \le i \le N_B$, the matrix $B_i$, $1 \le i \le N_B$, and the matrix $W_2$ are respectively indicated by $PMI_{11}$, $PMI_{12}$, and $PMI_2$ in the codebook.

Specifically, sending a precoding matrix indicator PMI to the base station may also include: sending precoding matrix indicators $PMI_{1,i}$ $1 \le i \le N_B/2$ and $PMI_2$ to the base station, where $PMI_{1,i}$, $1 \le i \le N_B/2$ and $PMI_2$ are used to indicate a matrix $X_{2i-1}=X_{2i}=A_{2i}\otimes B_{2i}$, $1\leq i\leq N_B/2$ and the matrix $W_2$ respectively; and in this case, $X_{2i-1}=X_{2i}$, and the matrices appear in pairs; or sending precoding matrix indicators $PMI_{11,i}$, $PMI_{12,i}$, and $PMI_2$ to the base station, where $PMI_{11,i}$, $PMI_{12,i}$, and $PMI_2$ are used to indicate a matrix $A_{2i-1}=A_{2i}$, $1\leq i\leq N_B/2$, the matrix $B_{2i-1}=B_{2i}$, $1\leq i\leq N_B/2$, and the matrix $W_2$, respectively; and in this case, $A_{2i-1}=A_{2i}$, $B_{2i-1}=B_{2i}$, and the matrices appear in pairs.

Further, the precoding matrix indicators $PMI_1$ and $PMI_2$, or the precoding matrix indicators $PMI_{11}$, $PMI_{12}$, and $PMI_2$ have different time domain granularities or frequency domain granularities, for example, $PMI_1$ and $PMI_2$, or $PMI_{11}$, $PMI_{12}$, and $PMI_2$ separately indicate different periods or bandwidth channel features, or are obtained based on different subframe periods or subband sizes.

Alternatively, further, the precoding matrix indicators $PMI_{11}$ and $PMI_{12}$ are sent to the base station according to different time periods.

Specifically, sending a precoding matrix indicator PMI to the base station may also include: sending precoding matrix indicators $PMI_{1,i}$, $1\leq i\leq N_B$ and $PMI_2$ to the base station, where $PMI_{1,i}$, $1\leq i\leq N_B$ and $PMI_2$ are used to indicate the matrix $X_i=A_i\otimes B_i$, $1\leq i\leq N_B$ and the matrix $W_2$, respectively; or sending precoding matrix indicators $PMI_{11}$, $PMI_{12}$, and $PMI_2$ to the base station, where $PMI_{11,i}$, $PMI_{12,i}$, and $PMI_2$ are used to indicate the matrix $A_i$, $1\leq i\leq N_B$, the matrix $B_i$, $1\leq i\leq N_B$, and the matrix $W_2$, respectively.

Specifically, sending a precoding matrix indicator PMI to the base station may be sending, by the UE, the precoding matrix indicator PMI to the base station through a physical uplink control channel (PUCCH) or a physical uplink shared channel (PUSCH).

Further, sending a precoding matrix indicator PMI to the base station may be separately sending, by the UL by using different subframes or according to different periods, the foregoing $PMI_1$ and $PMI_2$; or $PMI_{11}$, $PMI_{12}$, and $PMI_2$; or $PMI_{1,i}$, $1\leq i\leq N_B$, and $PMI_2$; or $PMI_{11,i}$, $PMI_{12,i}$, $1\leq i\leq N_B$, and $PMI_2$; or $PMI_{1,i}$, $1\leq i\leq N_B/2$, and $PMI_2$; or $PMI_{11,i}$, $PMI_{12,i}$, $1\leq i\leq N_B/2$ and $PMI_2$ to the base station.

Further, sending a precoding matrix indicator PMI to the base station may also be separately sending, by the UE for different subbands or subband sizes in a frequency domain, the foregoing $PMI_1$ and $PMI_2$; or $PMI_{11}$, $PMI_{12}$, and $PMI_2$; or $PMI_{1,i}$, $1\leq i\leq N_B$, and $PMI_2$; or $PMI_{11,i}$, $PMI_{12,i}$, $1\leq i\leq N_B$, and $PMI_2$; or $PMI_{1,i}$, $1\leq i\leq N_B/2$, and $PMI_2$; or $PMI_{11,i}$, $PMI_{12,i}$, $1\leq i\leq N_B/2$ and $PMI_2$ to the base station.

In this embodiment of the present invention, a user equipment determines and sends a precoding matrix indicator PMI, where the PMI indicates a precoding matrix. The precoding matrix has a structure of $W=W_1W_2$, where $W_1$ is a block diagonal matrix in which each block matrix on a diagonal line is $X_i=A_i\otimes B_i$, and i=1, . . . , $N_B$, where the matrix $A_i$ or the matrix $B_i$ effectively supports channel state information quantization in a horizontal direction or a vertical direction, respectively. This can fully use a degree of freedom of an active antenna system AAS in a horizontal direction and a vertical direction, thereby greatly improving channel state information feedback accuracy. In addition, multiple block matrices $X_i$ may separately correspond to antenna groups of different polarizations or at different locations, so that the foregoing precoding matrix matches multiple antenna deployments or configurations. The foregoing codebook structure greatly improves performance of MIMO, and especially that of MU-MIMTO. Moreover, one or more PMIs are fed back based on a subset to indicate a precoding matrix, which fully uses time/frequency domain/spatial correlation of a channel, thereby greatly reducing feedback overheads.

Figure 5:
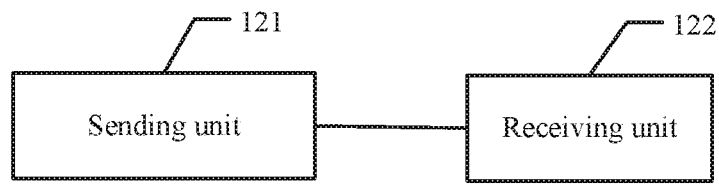
FIG. 5 is a schematic structural diagram of composition of a base station eNB in FIG. 3.

FIG. 5 is a base station eNB 12 for determining a precoding matrix indicator according to an embodiment of the present invention. As shown in the figure, the base station eNB 12 includes: a sending unit 121 and a receiving unit 122.

The sending unit 121 is configured to send a reference signal to a user equipment UE.

Specifically, the reference signal may include a channel state information reference signal (CSI RS), a demodulation reference signal (demodulation RS, DM RS), or a cell-specific reference signal (cell-specific RS, CRS). A base station eNB may notify the user equipment UE of a resource configuration of the reference signal by using RRC (Radio Resource Control) signaling or downlink control information (DC), and instruct the UE to obtain the reference signal from a corresponding resource or subframe. The user equipment UE may also implicitly obtain, based on other information such as a cell identity ID, the resource configuration of the reference signal, and obtain the reference signal from the corresponding resource or subframe. The receiving unit 122 is configured to receive a precoding matrix indicator PMI sent by the user equipment UE, where the PMI corresponds to a precoding matrix selected, based on the reference signal, from a codebook by the user equipment; and a precoding matrix W included in the codebook is a product of two matrices $W_1$ and $W_2$, and the precoding matrix W has the structure shown in formulas (1) to (4).

Specifically, each column of the matrix $A_i$ or of the matrix $B_i$ may be a DFT vector or may be a column vector of a Hadamard matrix, as shown in formulas (5) to (11); or specifically, the matrix $A_i$ or the matrix $B_i$ may also be a precoding matrix in a 2-antenna codebook or a 4-antenna codebook of an LTE R8 system, or in an 8-antenna codebook of an LTE R10 system.

Further, the matrix $W_2$ is used to select or weight and combine a column vector in the matrix $W_1$, so as to form the matrix W.

In an example in which the number of block matrices is $N_B=2$ and there are 32 transmit antennas, matrices that form the precoding matrix W may separately be those shown in formulas (12) to (23); or $B_i$ is a precoding matrix in a 4-antenna rank-4 codebook of an LTE R8 system.

In an example in which the number of block matrices is $N_B=2$ and there are 32 transmit antennas, matrices that form the precoding matrix W may separately be those shown in formulas (24) to (30); or $B_i$ is a precoding matrix in a 4-antenna rank-4 codebook of an LTE R8 system.

Specifically, the precoding matrix selected, based on the reference signal, from a codebook includes: the precoding matrix selected, based on the reference signal, from a codebook subset, where the codebook subset may be a codebook subset that is predefined; or a codebook subset that is reported by the UE to the base station eNB, determined by the base station eNB based on the report from the UE, and notified to the UE; or a codebook subset that is determined and reported by the UE, for example, a latest reported codebook subset.

Further, the codebook subset may include a subset of the matrix $W_1$, the matrix $A_i$, the matrix $B_i$, or the matrix $W_2$.

Further, the codebook subsets have a same subset of the matrix $W_1$, the matrix $A_i$, the matrix $B_i$, or the matrix $W_2$. In this way, the codebook subsets overlap each other, which can overcome an edge effect of channel state information quantization.

Further, in the precoding matrix, block matrices $X_i$ and $X_j$, $i \neq j$ may be unequal, or may also be equal. If there are multiple cases that $X_i$ and $X_j$, $i \neq j$ are equal, for example, $X_i$ and $X_j$, $i \neq j$ that are equal may appear in pairs, feedback overheads can be further reduced.

In addition, the foregoing matrix $A_i$ or matrix $B_i$ may also use another form, which is not further elaborated herein.

It should be noted that, each of the foregoing matrices may further be multiplied by a scale factor, so as to implement power normalization or power balancing.

Specifically, the precoding matrix is included in a precoding matrix set or a codebook; and the PMI is used to indicate the selected precoding matrix in the precoding matrix set or the codebook.

Specifically, receiving a precoding matrix indicator PMI sent by the user equipment UE includes: receiving the precoding matrix indicator PMI sent by the user equipment UE, where the PMI may include only one specific value. In this case, the PMI directly indicates the precoding matrix W. For example, if there are a total of 16 different precoding matrices, PMI=0, . . . , 15 may be used to respectively indicate precoding matrices W whose labels are 0, 1, . . . 15.

Specifically, receiving a precoding matrix indicator PMI sent by the user equipment UE may also include: receiving precoding matrix indicators $PMI_1$ and $PMI_2$ sent by the user equipment UE, where $PMI_1$ and $PMI_2$ are used to indicate the matrix $X_i = A_i \otimes B_i$, $1 \leq i \leq N_B$ in formula (2) and the matrix $W_2$, respectively; and in this case, the matrix $X_i = A_i \otimes B_i$, $1 \leq i \leq N_B$ and the matrix $W_2$ are respectively indicated by $PMI_1$ and $PMI_2$ in the codebook; or receiving precoding matrix indicators $PMI_{11}$, $PMI_{12}$, and $PMI_2$ sent by the user equipment UE, where $PMI_{11}$, $PMI_{12}$, and $PMI_2$ are used to indicate the matrix $A_i$, $1 \leq i \leq N_B$, the matrix $B_i$, $1 \leq i \leq N_B$, and the matrix $W_2$, respectively; and in this case, the matrix $A_i$, $1 \leq i \leq N_B$, the matrix $B_i$, $1 \leq i \leq N_B$, and the matrix $W_2$ are respectively indicated by $PMI_{11}$, $PMI_{12}$, and $PMI_2$ in the codebook.

Further, the precoding matrix indicators $PMI_1$ and $PMI_2$, or the precoding matrix indicators $PMI_{11}$, $PMI_{12}$, and $PMI_2$ have different time domain granularities or frequency domain granularities, for example, $PMI_1$ and $PMI_2$, or $PMI_{11}$, $PMI_{12}$, and $PMI_2$ separately indicate different periods or bandwidth channel features, or are obtained based on different subframe periods or subband sizes.

Alternatively, further, the precoding matrix indicators $PMI_{11}$ and $PMI_{12}$ are sent to the base station according to different time periods.

Specifically, receiving a precoding matrix indicator PMI sent by the user equipment UE may also include: receiving precoding matrix indicators $PMI_{1,i}$, $1 \leq i \leq N_B$, and $PMI_2$ sent by the user equipment UE, where $PMI_{1,i}$, $1 \leq i \leq N_B$ and $PMI_2$ are used to indicate the matrix $X_i = A_i \otimes B_i$, $1 \leq i \leq N_B$ the matrix $W_2$, respectively; or receiving precoding matrix indicators $PMI_{11,i}$, $PMI_{12,i}$, and $PMI_2$ sent by the user equipment UE, where $PMI_{11,i}$, $PMI_{12,i}$, and $PMI_2$ are used to indicate the matrix $A_i$, $1 \leq i \leq N_B$, the matrix $B_i$, $1 \leq i \leq N_B$, and the matrix $W_2$, respectively; or receiving precoding matrix indicators $PMI_{1,i}$, $1 \leq i \leq N_B/2$, and $PMI_2$ sent by the user equipment UE, where $PMI_{1,i}$, $1 \leq i \leq N_B/2$ and $PMI_2$ are used to indicate a matrix $X_{2i-1} = X_{2i} = A_{2i} \otimes B_{2i}$, $1 \leq i \leq N_B/2$, and the matrix $W_2$, respectively; and in this case, $X_{2i-1} = X_{2i}$, and the matrices appear in pairs; or receiving precoding matrix indicators $PMI_{11,i}$, $PMI_{12,i}$, and $PMI_2$ sent by the user equipment UE, where $PMI_{11,i}$, $PMI_{12,i}$, and $PMI_2$ are used to indicate a matrix $A_{2i-1} = A_{2i}$, $1 \leq i \leq N_B/2$, the matrix $B_{2i-1} = B_{2i}$, $1 \leq i \leq N_B/2$, and the matrix $W_2$, respectively; and in this case, $A_{2i-1} = A_{2i}$, $B_{2i-1} = B_{2i}$, and the matrices appear in pairs.

Specifically, receiving a precoding matrix indicator PMI sent by the user equipment UE may be receiving, through a physical uplink control channel (PUCCI) or a physical uplink shared channel (PUSCH), the precoding matrix indicator PMI sent by the user equipment UE.

Further, receiving a precoding matrix indicator PMI sent by the user equipment UE may be separately receiving, by the base station by using different subframes or according to different periods, the foregoing precoding matrix indicators sent by the user equipment UE, which are $PMI_1$ and $PMI_2$; or $PMI_{11}$, $PMI_{12}$, and $PMI_2$; or $PMI_{1,i}$, $1 \leq i \leq N_B$ and $PMI_2$; or $PMI_{11,i}$, $PMI_{12,i}$, $1 \leq i \leq N_B$, and $PMI_2$; or $PMI_{11,i}$, $PMI_{12,i}$, $1 \leq i \leq N_B/2$, and $PMI_2$; or may also be receiving the foregoing $PMI_1$ and $PMI_2$; or $PMI_{11}$ $PMI_{12}$, and $PMI_2$; or $PMI_{1,i}$, $1 \leq i \leq N_B$ and $PMI_2$; or $PMI_{11,i}$, $PMI_{12,i}$, $1 \leq i \leq N_B$, and $PMI_2$; or $PMI_{11,i}$, $PMI_{12,i}$, $1 \leq i \leq N_B/2$, and $PMI$ that are sent for different subbands or subband sizes in a frequency domain by the user equipment UE.

In this embodiment of the present invention, the base station eNB receives a precoding matrix indicator PMI sent by the user equipment UE, where the PMI indicates a precoding matrix. The precoding matrix has a structure of $W = W_1 W_2$, where $W_1$ is a block diagonal matrix in which each block matrix on a diagonal line is $X_i = A_i \otimes B_i$, and $i = 1, \ldots, N_B$, where the matrix $A_i$ or the matrix $B_i$ effectively supports channel state information quantization in a horizontal direction or a vertical direction, respectively. This can fully use a degree of freedom of an active antenna system AAS in a horizontal direction and a vertical direction, thereby greatly improving CSI feedback accuracy. In addition, multiple block matrices $X_i$ may separately correspond to antenna groups of different polarizations or at different locations, so that the foregoing precoding matrix matches multiple antenna deployments or configurations. The foregoing codebook structure greatly improves performance of MIMO, and especially that of MU-MIMO. Moreover, one or more PMIs are fed back based on a subset to indicate a precoding matrix, which fully uses time/frequency domain/spatial correlation of a channel, thereby greatly reducing feedback overheads.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described structures and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In combination with the embodiments disclosed in this specification, method or algorithm steps may be implemented by hardware, a software module executed by a processor, or a combination thereof. The software module may reside in a random access memory (RAM), memory, a read-only memory (ROM), an electrically programmable ROM, an electrically erasable programmable ROM, a register, a hard disk, a removable disk, a CD-ROM, or any other form of storage medium known in the art.

The foregoing specific embodiments further describe the objectives, technical solutions, and beneficial effects of the present invention in detail. It should be understood that the foregoing descriptions are merely specific embodiments of the present invention, but are not intended to limit the protection scope of the present invention. Any modification, equivalent replacement, or improvement made without departing from the spirit and principle of the present invention should fall within the protection scope of the present invention.

What is claimed is:

1. A method for determining a precoding matrix indicator, the method comprising:
   sending, by a base station, a reference signal to a terminal device; and
   receiving, by the base station, a precoding matrix indicator (PMI) from the terminal device, wherein the PMI corresponds to a precoding matrix in a codebook, wherein each precoding matrix W comprised in the codebook is a product of two matrices $W_1$ and $W_2$, $W=W_1W_2$, wherein the matrix $W_1$ is a block diagonal matrix, $W_1=\text{diag}\{X_1, \ldots, X_{N_B}\}$, $N_B>1$, each block matrix $X_i$ being a Kronecker product of a matrix $A_i$ and a matrix $B_i$, $X_i=A_i \otimes B_i$, $1 \le i \le N_B$, wherein the matrix $A_i$ and the matrix $B_i$ are for channel state information quantization in two degrees of freedom of an antenna array respectively.

2. The method according to claim 1, wherein each column of the matrix $A_i$ and the matrix $B_i$ is a discrete Fourier transform (DFT) vector, and the two degrees of freedom of the antenna array comprise a degree of freedom in a horizontal direction and a degree of freedom in a vertical direction.

3. The method according to claim 1, wherein receiving by the base station the PMI from the terminal device comprises:
   receiving a third precoding matrix indicator $PMI_{11}$, a fourth precoding matrix indicator $PMI_{12}$, and a fifth precoding matrix indicator $PMI_2$ from the terminal device, wherein the third precoding matrix indicator $PMI_{11}$ is used to indicate the matrix $A_i$, wherein $1 \le i \le N_B$; the fourth precoding matrix indicator $PMI_{12}$ is used to indicate the matrix $B_i$, wherein $1 \le i \le N_B$, and the fifth precoding matrix indicator $PMI_2$ is used to indicate the matrix $W_2$.

4. The method according to claim 1, wherein block matrices in the matrix $W_1$ satisfy $X_{2j-1}=X_{2j}$, $1 \le j \le N_B/2$.

5. The method according to claim 1, wherein the matrix $W_2$ is used to select or weight and combine at least one column vector in the matrix $W_1$ to form the matrix W.

6. The method according to claim 1, wherein the codebook comprises a codebook subset consisting of precoding matrices corresponding to a subset of the matrix $A_i$ and the matrix $B_i$.

7. The method according to claim 6, further comprises:
   notifying, by the base station, the subset of the matrix $A_i$ and the matrix $B_i$ to the terminal device.

8. A device, comprising:
   a transmitter configured to send a reference signal to a terminal device; and
   a receiver configured to receive a precoding matrix indicator (PMI) from the terminal device, wherein the PMI corresponds to a precoding matrix in a codebook, wherein each precoding matrix W comprised in the codebook is a product of two matrices $W_1$ and $W_2$, $W=W_1W_2$, wherein the matrix $W_1$ is a block diagonal matrix, $W_1=\text{diag}\{X_1, \ldots, X_{N_B}\}$, $N_B>1$, each block matrix $X_i$ being a Kronecker product of a matrix $A_i$ and a matrix $B_i$, $X_i=A_i \otimes B_i$, $1 \le i \le N_B$, wherein the matrix $A_i$ and the matrix $B_i$ are for channel state information quantization in two degrees of freedom of an antenna array respectively.

9. The device according to claim 8, wherein each column of the matrix $A_i$ and the matrix $B_i$ is a discrete Fourier transform (DFT) vector, and the two degrees of freedom of the antenna array comprise a degree of freedom in a horizontal direction and a degree of freedom in a vertical direction.

10. The device according to claim 8, wherein receiving the PMI from the terminal device comprises:
    receiving a third precoding matrix indicator $PMI_{11}$, a fourth precoding matrix indicator $PMI_{12}$, and a fifth precoding matrix indicator $PMI_2$ from the terminal device, wherein the third precoding matrix indicator $PMI_{11}$ is used to indicate the matrix $A_i$, wherein $1 \le i \le N_B$; the fourth precoding matrix indicator $PMI_{12}$ is used to indicate the matrix $B_i$, wherein $1 \le i \le N_B$, and the fifth precoding matrix indicator $PMI_2$ is used to indicate the matrix $W_2$.

11. The device according to claim 8, wherein block matrices in the matrix $W_1$ satisfy $X_{2j-1}=X_{2j}$, $1 \le j \le N_B/2$.

12. The device according to claim 8, wherein the matrix $W_2$ is used to select or weight and combine at least one column vector in the matrix $W_1$ to form the matrix W.

13. The device according to claim 8 wherein the codebook comprises a codebook subset consisting of precoding matrices corresponding to a subset of the matrix $A_i$ and the matrix $B_i$.

14. The device according to claim 13, the transmitter is configured to notify the subset of the matrix $A_i$ and the matrix $B_i$ to the terminal device.

15. A non-transitory computer-readable storage medium storing instructions which, when executed by at least one processor in a base station, cause the base station to:
    send a reference signal to a terminal device; and
    receive a precoding matrix indicator (PMI) from the terminal device, wherein the PMI corresponds to a precoding matrix in a codebook, wherein each precoding matrix W comprised in the codebook is a product of two matrices $W_1$ and $W_2$, $W=W_1W_2$, wherein the matrix $W_1$ is a block diagonal matrix, $W_1=\text{diag}\{X_1, \ldots, X_{N_B}\}$, $N_B>1$, each block matrix $X_i$ being a Kronecker product of a matrix $A_i$ and a matrix $B_i$, $X_i=A_i \otimes B_i$, $1 \le i \le N_B$, wherein the matrix $A_i$ and the matrix $B_i$ are for channel state information quantization in two degrees of freedom of an antenna array respectively.

16. The non-transitory computer-readable storage medium according to claim 15, wherein each column of the matrix $A_i$ and the matrix $B_i$ is a discrete Fourier transform (DFT) vector, and the two degrees of freedom of the antenna array comprise a degree of freedom in a horizontal direction and a degree of freedom in a vertical direction.

17. The non-transitory computer-readable storage medium according to claim 15, wherein receiving the PMI from the terminal device comprises:
    receiving a third precoding matrix indicator $PMI_{11}$, a fourth precoding matrix indicator $PMI_{12}$, and a fifth precoding matrix indicator $PMI_2$ from the terminal device, wherein the third precoding matrix indicator $PMI_{11}$ is used to indicate the matrix $A_i$, wherein $1 \le i \le N_B$; the fourth precoding matrix indicator $PMI_{12}$ is used to indicate the matrix $B_i$ wherein $1 \leq i \leq N_B$, and the fifth precoding matrix indicator $PMI_2$ is used to indicate the matrix $W_2$.

18. The non-transitory computer-readable storage medium according to claim 15, wherein block matrices in the matrix $W_1$ satisfy $X_{2j-1}=X_{2j}$, $1 \leq j \leq N_B/2$.

19. The non-transitory computer-readable storage medium according to claim 15, wherein the matrix $W_2$ is used to select or weight and combine at least one column vector in the matrix $W_1$ to form the matrix W.

20. The non-transitory computer-readable storage medium according to claim 15, wherein the codebook comprises a codebook subset consisting of precoding matrices corresponding to a subset of the matrix $A_i$ and the matrix $B_i$.

21. The non-transitory computer-readable storage medium according to claim 20, wherein the instructions which, when executed by at least one processor in the base station, cause the base station to notify the subset of the matrix $A_i$ and the matrix $B_i$ to the terminal device.

22. A communications device, comprising:
at least one processor; and
a memory configured to store computer operation instructions that, when executed by the at least one processor, cause the at least one processor to perform:
sending a reference signal to a terminal device; and
receiving a precoding matrix indicator (PMI) from the terminal device, wherein the PMI corresponds to a precoding matrix in a codebook, wherein each precoding matrix W comprised in the codebook is a product of two matrices $W_1$ and $W_2$, $W=W_1W_2$, wherein the matrix $W_1$ is a block diagonal matrix, $W_1$=diag$\{X_1, \ldots, X_{N_B}\}N_B>1$ each block matrix $X_i$ being a Kronecker product of a matrix $A_i$ and a matrix $B_i$, $X_i=A_i \otimes B_i$, $1 \leq i \leq N_B$, wherein the matrix $A_i$ and the matrix $B_i$ are for channel state information quantization in two degrees of freedom of an antenna array respectively.

23. The communications device according to claim 22, wherein each column of the matrix $A_i$ and the matrix $B_i$ is a discrete Fourier transform (DFT) vector, and the two degrees of freedom of the antenna array comprise a degree of freedom in a horizontal direction and a degree of freedom in a vertical direction.

24. The communications device according to claim 22, wherein receiving the PMI from the terminal device comprises:
receiving a third precoding matrix indicator $PMI_{11}$, a fourth precoding matrix indicator $PMI_{12}$, and a fifth precoding matrix indicator $PMI_2$ from the terminal device, wherein the third precoding matrix indicator $PMI_{11}$ is used to indicate the matrix $A_i$, wherein $1 \leq i \leq N_B$; the fourth precoding matrix indicator $PMI_{12}$ is used to indicate the matrix $B_i$ wherein $1 \leq i \leq N_B$, and the fifth precoding matrix indicator $PMI_2$ is used to indicate the matrix $W_2$.

25. The communications device according to claim 22, wherein block matrices in the matrix $W_1$ satisfy $X_{2j-1}=X_{2j}$, $1 \leq j \leq N_B/2$.

26. The communications device according to claim 22, wherein the matrix $W_2$ is used to select or weight and combine at least one column vector in the matrix $W_1$ to form the matrix W.

27. The communications device according to claim 22, wherein the codebook comprises a codebook subset consisting of precoding matrices corresponding to a subset of the matrix $A_i$ and the matrix $B_i$.

28. The communications device according to claim 27, the at least one processor is further caused to perform:
notifying the subset of the matrix $A_i$ and the matrix $B_i$ to the terminal device.

* * * * *